United States Patent [19]

Kondoh

[11] Patent Number: 5,273,365
[45] Date of Patent: Dec. 28, 1993

[54] STABILIZED LINEAR MOTION ROLLING CONTACT GUIDE UNIT

[75] Inventor: Takuo Kondoh, Yokonama, Japan

[73] Assignee: Nippon Thompson, Co., Ltd., Tokyo, Japan

[21] Appl. No.: 843,140

[22] Filed: Feb. 28, 1992

[30] Foreign Application Priority Data

Mar. 4, 1991 [JP] Japan .................................. 3-104929

[51] Int. Cl.⁵ ........................................... F16C 29/06
[52] U.S. Cl. ........................................ 384/44; 384/45
[58] Field of Search .................. 384/44, 45, 43, 53, 384/49

[56] References Cited

U.S. PATENT DOCUMENTS

| | | | |
|---|---|---|---|
| 4,764,032 | 8/1988 | Tanaka | 384/44 |
| 4,765,754 | 8/1988 | Slocum | 384/44 |
| 5,129,736 | 7/1992 | Tanaka | 384/45 |

Primary Examiner—Lenard A. Footland
Attorney, Agent, or Firm—Skjerven, Morrill, MacPherson, Franklin & Friel

[57] ABSTRACT

A linear motion rolling contact guide unit includes a rail which is formed at each side with a pair of oppositely oriented inner flat guide surfaces each extending in parallel with a longitudinal axis of the rail and with an inner Gothic arch shaped guide groove also extending in parallel with the longitudinal axis of the rail. The guide unit also includes a slider which is slidably mounted on the rail and which is formed with a pair of oppositely oriented outer flat guide surfaces each located opposite to and spaced part from an associated one of the inner flat guide surfaces to define a pair of first guide channels for rollers and also with an outer Gothic arch shaped guide groove located opposite to the inner Gothic arch shaped guide groove to define a second guide channel for balls.

9 Claims, 4 Drawing Sheets

STABILIZED LINEAR MOTION ROLLING CONTACT GUIDE UNIT

BACKGROUND OF THE INVENTION

1. Field of the Invention

This invention generally relates to a linear motion rolling contact guide unit, and, in particular, to an improvement of such a linear motion rolling contact guide unit excellent in both of dynamic and static stability suitable for use in machining tools, such as heavy cutting tools.

2. Description of the Prior Art

FIG. 4 illustrates a table assembly which may be advantageously used in a machining tool or the like. The illustrated table assembly includes a pair of elongated rails A and B extending in parallel as spaced apart from each other and over a desired distance, four sliders C through F slidably mounted on the rails A and B and a table Y fixedly mounted on the four sliders C through F. The sliders C through F are arranged such that two of them, i.e., C and D or E and F, are slidably mounted on the same rail A or B as spaced apart in a longitudinal direction. Thus, the table Y may move linearly back and forth longitudinally as indicated by a double-sided arrow G.

As shown in FIG. 5, each of the four sliders C through F defines, together with its related rail A or B, a linear motion rolling contact guide unit. In general, a linear motion rolling contact guide unit includes a rail extending over a desired distance, a slider slidably mounted on the rail and a plurality of rolling members interposed between the rail and the slider so as to allow to provide a relative linear motion between the rail and the slider. In the endless type of such a linear motion rolling contact guide unit, the slider is typically comprised of three blocks, i.e., a center block 17 and a pair of end blocks 12 and 13 located at the front and rear ends of the center block.

FIG. 5 illustrates a right half of a transverse cross section of a linear motion rolling contact guide unit defined by rail A and any one of the sliders C and D. In the structure shown in FIG. 5, the rail A is formed with a pair of oppositely inclined inner guide surfaces H and I at each of its opposite sides. The slider C or D has a center block L which includes a horizontal section and a pair of vertical sections Q to thereby define a generally U-shaped cross section. The vertical section A has its inner surface formed with a pair of oppositely inclined outer guide surfaces J and K located spaced apart and opposite to the inclined inner guide surfaces H and J, respectively. Therefore, a load channel is defined between the associated pair of inner and outer guide surfaces H and J or I and K.

The vertical section Q is provided with a pair of endless circulating paths in a crisscross arrangement when viewed in a longitudinal direction as shown in FIG. 5, and the first of the endless circulating paths includes the load channel (or load path section) H and J, a return path section O and a pair of curved connecting path sections S connecting the corresponding ends of the load and return path sections H and J and O. Similarly, the other second endless circulating path includes the load channel (or load path section) I and K, a return path section P and a pair of curved connecting path sections T connecting the corresponding ends of the load and return path sections I and K and P. A plurality of rollers M as rolling members are provided in the first endless circulating path and similarly a plurality of rollers N are provided in the second endless circulating path. In the upper load channels H and J, the rollers M are in rolling contact with both of the inner and outer inclined guide surfaces H and J so that a rolling contact is provided therebetween. In a similar manner, the rollers N are in rolling contact with both of the inclined inner and outer guide surfaces I and K in the lower load channel I and K. Typically, the load and return path sections are provided in the center block and the pair of curved connecting path sections are provided in the front and rear end blocks, respectively.

The linear motion rolling contact guide unit of the structure shown in FIG. 5 has an increased load bearing capacity and provides a smooth sliding motion at high accuracy. The guide unit or the table assembly as shown in FIGS. 4 and 5 are high in stability or rigidity in a static mode, but relatively low in dynamic stability or rigidity. Thus, a problem could arise when it is desired to stop the slider or table accurately at a desired location while carrying a relatively heavy load. Such a problem becomes appreciable when the control of positioning of the slider or table is desired to be carried out on the order of a few microns.

One possible approach to cope with this situation may be the use of balls as rolling members; however, in this case, the stability or rigidity in a static mode becomes degraded. Another approach would be a combination between rollers and a synthetic resin sheet. In this case, however, the durability of the synthetic resin sheet can be a problem and thus this approach only creates a new problem. It is also conceivable to incorporate an additional slider, which serves as a braking element, in combination with the sliders C through F. However, this approach also presents another problem such as increased mass and complication of a manufacturing process.

SUMMARY OF THE INVENTION

In accordance with the present invention, there is provided an improved linear motion rolling contact guide unit including a rail, a slider and a plurality of rolling members interposed between the rail and the slider. In the preferred embodiment of the present invention, the rail is provided, at each of its opposite sides, with a first inner guiding means of a first kind, a second inner guiding means of the first kind and a third inner guiding means of a second kind different from the first kind. The slider includes a horizontal section and a pair of vertical sections extending from the horizontal section to thereby define a generally U-shaped cross section. Each of the vertical sections is provided with a first outer guiding means of the first kind located opposite to the first inner guiding means, a second outer guiding means of the first kind located opposite to the second inner guiding means, and a third outer guiding means of the second kind located opposite to the third inner guiding means. And, a plurality of rolling members of the first kind are provided in a load path section defined between the first inner and outer guiding means and also in another load path section defined between the second inner and outer guiding means, and a plurality of rolling members of the second kind are provided in a load path section defined between the third inner and outer guiding means.

Preferably, each of the first and second inner and outer guiding means includes a flat guide surface, and the rolling members of the first kind are rollers which roll along the flat guide surface. Most preferably, the flat guide surface is an inclined guide surface, and in one embodiment, the first flat guide surface is inclined in a first direction and the second flat guide surface is inclined in a second direction opposite to the first direction. For example, the first flat guide surface may be oriented upwardly and the second flat guide surface may be oriented downwardly. The third inner and outer guiding means includes a pair of curved guide surfaces and the rolling members of the second kind are balls. In this case, the pair of curved guide surfaces defines a Gothic arch shape.

Preferably, the linear motion guide unit of the present invention includes three endless circulating paths in each of the two vertical sections of its slider. Each of the endless circulating paths includes a load path section, a return path section and a pair of curved connecting path sections connecting the corresponding ends of the load and return path sections. The load path section is defined by a pair of associated inner and outer guiding means.

Therefore, it is a primary object of the present invention to obviate the disadvantages of the prior art as described above and to provide an improved linear motion rolling contact guide unit.

Another object of the present invention is &o provide an improved linear motion rolling contact guide unit excellent in both of static and dynamic stability or rigidity.

A still further object of the present invention is to provide an improved linear motion rolling contact guide unit light in weight, compact and simple in structure and thus easy to manufacture.

Other objects, advantages and novel features of the present invention will become apparent from the following detailed description of the invention when considered in conjunction with the accompanying drawings.

BRIEF DESCRIPTION OF THE DRAWINGS

FIG. 4 is a schematic illustration showing in perspective view a typical prior art linear motion table assembly suitable for use in machining tools or the like.

DESCRIPTION OF THE PREFERRED EMBODIMENTS

Figure 1:
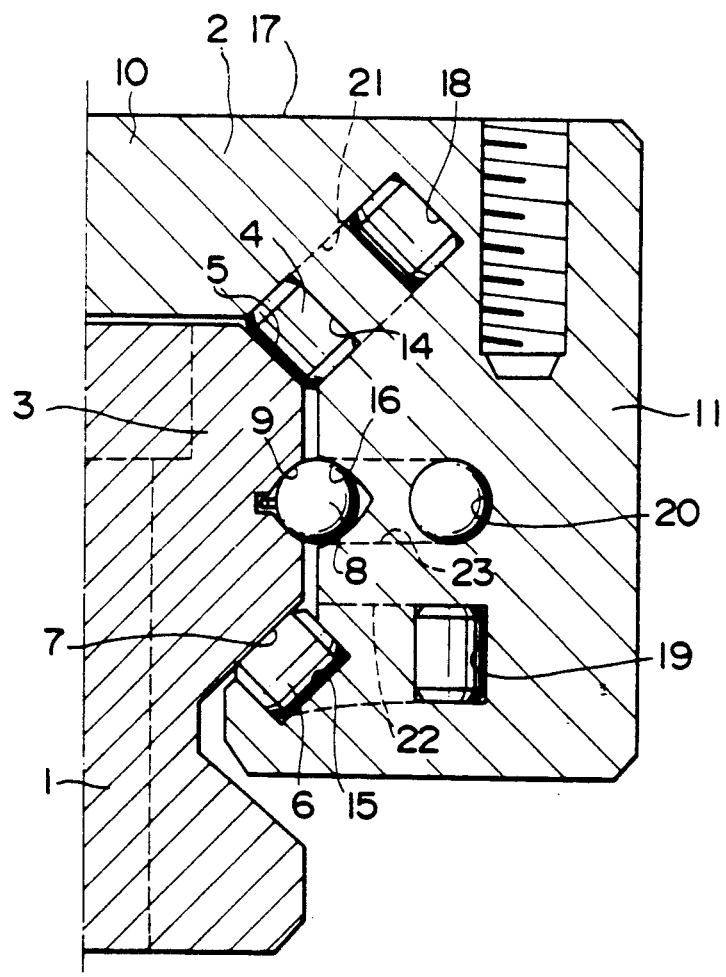
FIG. 1 is a schematic illustration showing in transverse cross section a right half section of a linear motion rolling contact guide unit constructed in accordance with one embodiment of the present invention.

Referring now to FIG. 1, there is schematically shown in transverse cross section a linear motion rolling contact guide unit constructed in accordance with one embodiment of the present invention. In the illustrated embodiment, since the linear motion guide unit is symmetrical in structure between left and right, only the right-hand half of the transverse cross section is actually shown. As shown, the present linear motion guide unit includes a rail 1 which extends over a desired length straight and which has a generally rectangular cross section, though it may have any desired cross sectional shape. In the illustrated embodiment, the rail has a particular side wall profile to define a head portion 3 which is formed with an inclined top inner guide surface 5 directed generally upwardly and with an oppositely inclined bottom inner guide surface 7 directed generally downwardly. Both of these inclined surfaces 5 and 7 are preferably flat surfaces as shown in the illustrated embodiment. The head portion 3 of the rail 1 is also formed with an inner guide groove 9 having a generally V-shaped cross section. Preferably, the inner guide groove 9 has a Gothic arch shaped cross sectional shape defined by a pair of curved surfaces.

Figure 4:
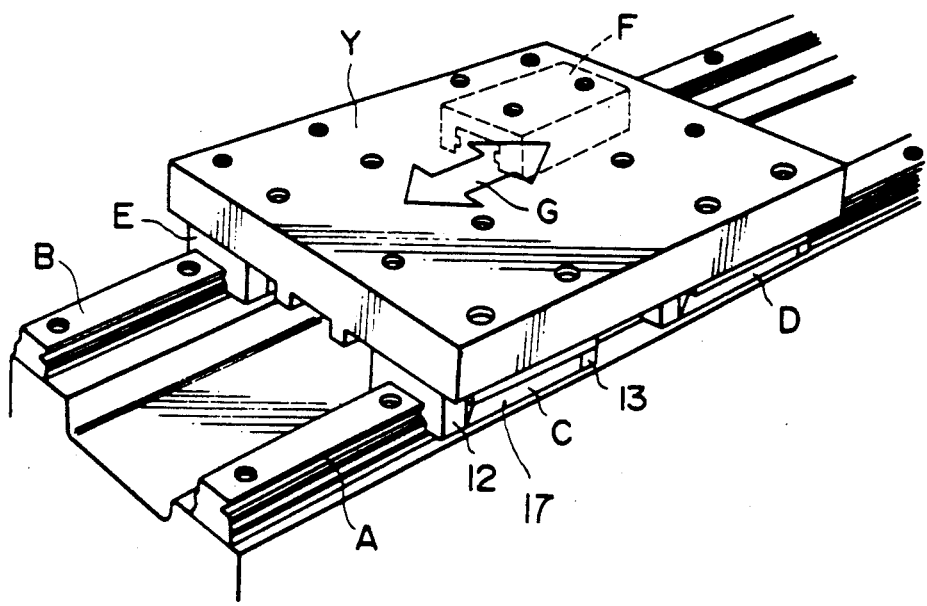
Figure 5:
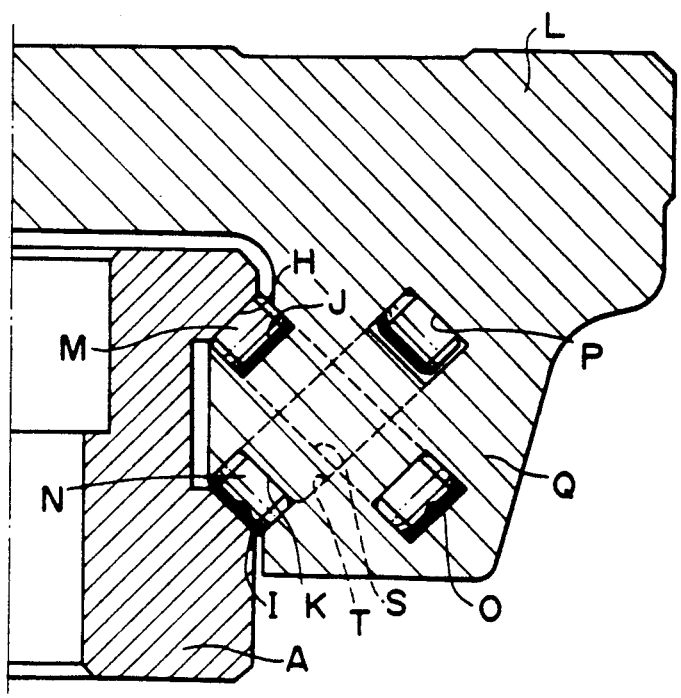
FIG. 5 is a schematic illustration showing in transverse cross section a right half of the linear motion rolling contact guide unit used in the table assembly shown in FIG. 4.

The illustrated linear motion guide unit also includes a slider 2 which generally comprises a horizonal section 10 and a pair of right and left side sections 11 which are located on the opposite sides of the rail when mounted and which extend downward from the horizontal section 10. Thus, the slider 2 has a generally inverted-U-shaped cross section and is slidably mounted on the rail 1 in a straddling manner. It is to be noted that as shown in FIG. 4 the slider 2 is also preferably comprised of three blocks. i.e., a center block and a pair of front and rear end blocks mounted on the opposite ends of the center block.

The slider 2 of the illustrated linear motion guide unit is provided with three endless circulating paths in each of the right and left vertical sections 11. Each of the endless circulating paths includes a load path section, a return path section and a pair of curved connecting path sections connecting the corresponding ends of the load and return path sections. In the illustrated embodiment, the slider 2 is formed with an inclined top outer guide surface 14 located spaced apart and opposite to the corresponding inclined guide surface 5, so that a first load path section is defined between the associated pair of top inner and outer guide surfaces 5 and 14. The outer guide surface 14 is directed generally downwardly and preferably a flat guide surface. The slider 2 is also formed with an inclined bottom outer guide surface 15 which is directed generally upwardly and located opposite to the corresponding inclined bottom inner guide surface 7. The inclined outer guide surface 15 is also preferably a flat surface as shown in the illustrated embodiment. Thus, a second load path section is defined between the associated pair of bottom inner and outer guide surfaces 7 and 15. In addition, the slider 2 is formed with a third outer guide groove 16 spaced apart and located opposite to the corresponding guide groove 9 and the third outer guide groove 16 has a similar cross sectional shape as that of the inner guide groove 9, so that the outer guide groove 16 is also preferably in the shape of a Gothic arch. Thus, a third load path section is defined between the inner and outer guide grooves 9 and 16.

The slider 2 is also formed with a first return path section 18 which is in communication with the first load path section defined between the associated inclined guide surfaces 5 and 14 via a pair of associated curved connecting path sections 21. Thus, a first endless circulating path is defined by the first load path section 5 and 14, the first return path section 18 and the pair of curved connecting path sections 21. Similarly, the slider 2 is formed with a second return path section 19 which is in communication with the second load path section defined between the associated inclined guide surfaces 7 and 15 via a pair of associated curved connecting path sections 22. Thus, a second endless circulating path is defined by the second load path section 7 and 15, the second return path section 19 and the pair of curved connecting path sections 22. Finally, the slider 2 is also formed with a third return path section 20 which is in communication with the third load path section defined between the associated guide grooves 9 and 16 via a pair of associated curved connecting path sections 23. Accordingly, a third endless circulating path is defined by the third load path section 9 and 16, the third return path section 20 and the pair of curved connecting path sections 23.

In the preferred embodiment, each of the curved connecting path sections 21, 22 and 23 is provided in either of the front or rear end blocks and the return path sections 18, 19 and 20, together with the outer inclined surfaces 14 and 15 and the outer guide groove 16, are formed in the center block. Such a structure is particularly advantageous from a manufacturing viewpoint. In addition, in the preferred embodiment, each of the first and second endless circulating paths has a generally rectangular cross sectional shape, while the third endless circulating path has a generally circular cross sectional shape.

In the embodiment illustrated in FIG. 1, each of the first and second endless circulating paths is filled with a plurality of rolling members of a first kind, or cylindrical rollers 4 or 6 in the illustrated embodiment, and the third endless circulating path is filled with a plurality of rolling members of a second kind, or balls 8 in the illustrated embodiment. For example, as the slider 2 moves along the rail 1, the rollers 4 in the first endless circulating path roll from the load path section 5 and 14 to the return path section 18 through one of the curved connecting path sections 21 and return to the load path section 5 and 14 through the remaining curved connecting path section 21 so that the rollers 4 roll indefinitely along this endless circulating path as long as the rail 1 extends. While the rollers 4 are present in the load path section, the rollers 4 are in rolling contact with both of the oppositely arranged inclined inner and outer guide surfaces 5 and 14 so that a rolling contact is provided between the rail 1 and the slider 2. Similarly, the rollers 6 and also the balls 8 provide a rolling contact between the rail 1 and the slider 2 while they are located in their respective load path sections 7 and 15 and 9 and 16.

Figure 2:
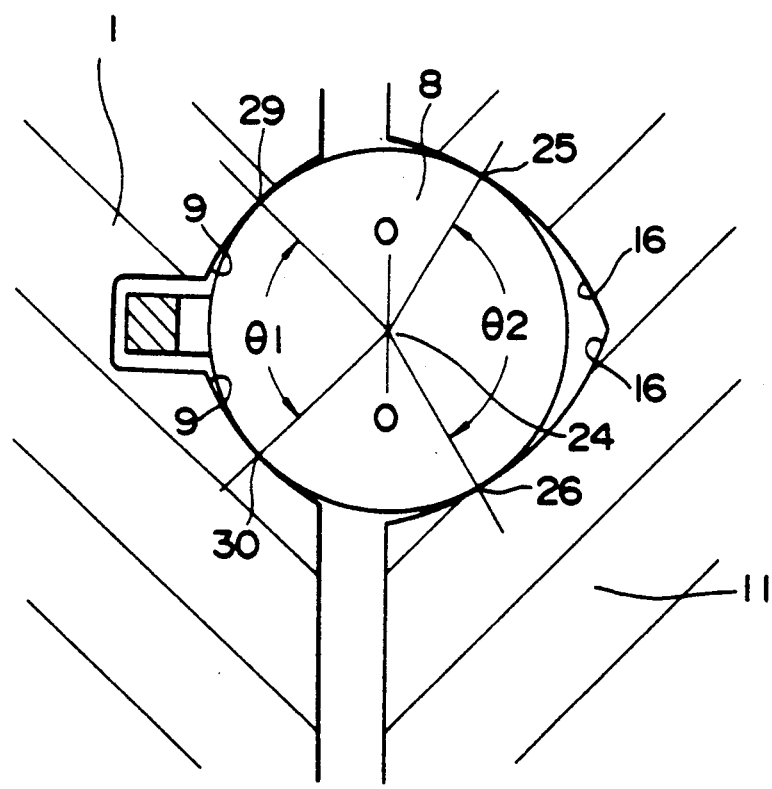
FIG. 2 is a schematic illustration showing on an enlarged scale the rolling contact condition of an additional load path section provided in the structure shown in FIG. 1.

FIG. 2 illustrates a rolling contact condition in the load path section defined between the oppositely arranged inner and outer guide grooves 9 and 16 of the third endless circulating path in the guide unit of FIG. 1. As shown, the ball 8 has two contact points 29 and 30 with the Gothic arch shaped inner guide groove 9, wherein an inner contact angle $\theta 1$ defined between these two contact points 29 and 30 is preferably set in the neighborhood of 90 degrees. The ball 8 also makes contact with the outer Gothic arch shaped guide groove 16 at two points 25 and 26, wherein an outer contact angle $\theta 2$ defined between these two contact points 26 and 26 is preferably set in the neighborhood of 120 degrees.

In the structure where the first contact angle $\theta 1$ is set approximately at 90 degrees and the second contact angle $\theta 2$ is set approximately at 120 degrees, the manner of rolling of the ball 8 around a vertical axis O—O passing through the center of the ball 24 while the slider 2 is in motion is as follows. Typically, the ball 8 is preloaded between the guide grooves 9 and 16 in the third load path section, so that a differential slippage or sliding occurs between the ball 8 and each of the guide grooves 9 and 16 during rolling of the ball 8. As a result, a sliding friction due to this differential slippage will act on the slider 2 as a sliding force.

In the illustrated structure where the first contact angle $\theta 1$ between the ball 8 and the inner guide groove 9 is approximately set at 90 degrees and the second contact angle $\theta 2$ between the ball 8 and the outer guide groove 16 is set approximately at 120 degrees, the sliding friction resulting from the differential slippage or sliding between the ball 8 and the outer guide groove 16 becomes larger than the sliding friction resulting from the differential slippage or sliding between the ball 8 and the inner guide groove 9 so that the net effect of these sliding frictions will produce a braking force acting on the slider 2. For this reason, if the contact angle between the ball 8 and the rail 1 (or inner guide groove 9) is held at constant, the braking force to be applied to the slider 2 may be set varyingly at a desired value simply by determining the contact angle between the ball 8 and the slider 2 (or outer groove 16) at a desired value.

When a load is externally applied to either or both of the rail 1 and the slider 2, it is mainly absorbed by the rollers 4 and/or 6 in the structure shown in FIG. 1. In this case, since the amount of elastic deformation of the rollers 4 and/or 6 is smaller than the amount of elastic deformation of the balls 8, the load to be borne by the present linear motion rolling contact guide unit do not act on the balls 8 in the load path section as a significantly large force. In the structure shown in FIG. 1, since the third load path section 9 and 16 for balls 8 is located between the first and second load path sections 5 and 14 and 7 and 15 for the rollers 4 and 6 at each side of the rail 1, the load bearing capability of the slider 2 in the lateral direction is significantly increased.

Although the load path section 9 and 16 for balls 8 is located between the top and bottom load path sections 5 and 14 and 7 and 15 for rollers 4 and 6, respectively, in the embodiment shown in FIG. 1, the present invention should not be limited to only such arrangement and it is also possible to take any other arrangement. For example, FIG. 3 shows an alternative arrangement in which a load path section for balls is located at the lowest level and two upper and lower load path sections for rollers are both located above the load path section for balls.

Figure 3:
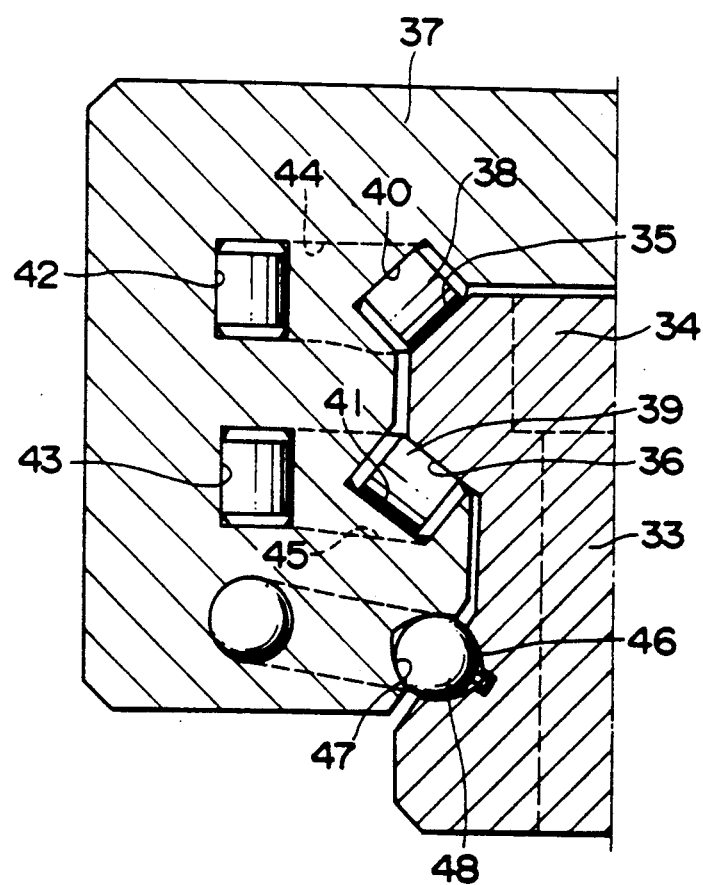
FIG. 3 is a schematic illustration showing in transverse cross section a left half section of a linear motion rolling contact guide unit constructed in accordance with another embodiment of the present invention.

Described more in detail with reference to FIG. 3, there is schematically shown a linear motion rolling contact guide unit constructed in accordance with another embodiment of the present invention, and the illustrated embodiment includes a rail 33 which extends longitudinally over a desired length and which has a head portion 34 at its top in cross section. Similarly with the first embodiment shown in FIG. 2, since the present embodiment also has a symmetrical structure between the left-hand half and the right-hand half in cross section, only the left-hand half is shown in FIG. 3. The head portion 34 of the rail 33 is formed with an upper inclined inner guide surface 35 as first inner guiding means which is oriented generally upwardly and also with a lower inclined inner guide surface 36 as second inner guiding means which is oriented generally downwardly. In the preferred embodiment, both of the upper and lower inclined inner guide surfaces 35 and 36 are flat surfaces. The rail 33 of this embodiment is also formed with an inner guide groove 46 similarly as the first embodiment shown in FIG. 1, but, in this embodiment, this inner guide groove 46 is not located at the head portion 34 or between the upper and lower guide surfaces 35 and 36, and, instead, it is located below both of the upper and lower guide surfaces 35 and 36 and at a base portion of the rail 33. In the preferred embodiment, the inner guide groove 46 has a Gothic arch shape defined by a pair of curved surfaces.

The present guide unit also includes a slider 37 which also includes a horizontal section and a pair of vertical sections extending downward from the horizontal section to thereby define a generally inverted-U-shaped cross section so that the slider 37 is slidably mounted on the rail 33 in a straddling fashion. The slider 37 is formed with a downwardly oriented, upper inclined outer guide surface 40 spaced apart and located opposite to the associated upper inclined inner guide surface 35 of the rail 33, and, thus, a first load path section (or load channel) is defined between the oppositely arranged guide surfaces 35 and 40. In the preferred embodiment, the outer guide surface 40 is also a substantially a flat surface. The slider 37 is also formed with an upwardly oriented, lower inclined outer guide surface 41 spaced apart and located opposite to the associated lower inclined inner guide surface 36 of the rail 33. Accordingly, a second load path section 36 and 41 (or load channel) is defined between the oppositely arranged guide surfaces 36 and 41. The guide surface 41 is also preferably a substantially flat guide surface. The slider 37 is moreover formed with an outer guide groove 47 spaced apart and located opposite to the inner guide groove 46 of the rail 33 so that a third load path section (or load channel) is defined between the oppositely arranged guide grooves 46 and 47. Preferably, the outer guide groove 47 is also defined as a Gothic arch shape similar in form with the associated inner guide groove 46.

In addition, the slider 37 is also formed with three endless circulating paths similarly with the first embodiment shown in FIG. 1. That is, the slider 37 of this embodiment is provided with a first endless circulating path including the first load path section 35 and 40, a return path section 42 and a pair of curved connecting path sections 44 connecting the corresponding ends of the load and return path sections. The slider 37 is also provided with a second endless circulating path including the second load path section 36 and 41, a return path section 43 and a pair of curved connecting path sections connecting the corresponding ends of the load and return path sections and with a third endless circulating path including the third load path section 46 and 47, a return path section and a pair of curved connecting path sections connecting the corresponding ends of the load and return path sections. In the preferred embodiment, both of the first and second endless circulating paths have a substantially rectangular cross sectional shape and the third endless circulating path has a substantially circular cross sectional shape.

In the embodiment illustrated in FIG. 3, a plurality of rollers 38 are provided in the first endless circulating path and similarly a plurality of rollers 39 are provided in the second endless circulating path; whereas, a plurality of balls 48 are provided in the third endless circulating path. Preferably, the rolling contact condition between the ball 48 and each of the Gothic arch shaped inner and outer guide grooves 46 and 47 in the third load path section in this embodiment has a condition similar to that shown in FIG. 2. Therefore, the first contact angle $\theta_1$ defined between the two contact points between the ball 48 and the inner guide groove 46 is set approximately at 90 degrees and the second contact angle $\theta_2$ defined between the two contact points between the ball 48 and the outer guide groove 47 is set approximately at 120 degrees. Thus, in this embodiment also, a similar braking action as described above with respect to the first embodiment shown in FIG. 1 would be produced. However, in this embodiment, since both of the first and second load path sections 35 and 40 and 36 and 41 for rollers 38 and 39, respectively, are formed at the head portion 34 of the rail 33 and the third load path section 46 and 47 for balls 48 is formed at the base portion of the rail 33, the rail 33 may be formed substantially symmetrical in shape not only between its left-hand half and right-hand half, but also between its upper half and lower half, so that any distortion which may be produced in the rail 33 due to heat can be significantly reduced, which thus contributes to provide a high precision linear motion guide unit.

As described above, in accordance with the present invention, because of the provision of two differently oriented load path sections for rollers as one kind of rolling members at each side of a rail, a high static stability or rigidity in operation can be obtained, and, since an additional load path section is provided for balls as another kind of rolling members at each side of the rail, a high dynamic stability or rigidity in operation can be obtained without degrading the static stability. Thus, the present linear motion guide unit can be advantageously used for machining tools, such as heavy duty cutting tools.

While the above provides a full and complete disclosure of the preferred embodiments of the present invention, various modifications, alternate constructions and equivalents may be employed without departing from the true spirit and scope of the invention. For example, although specific arrangement, dimensions and conditions have been given for the above-described embodiments, such parameters can vary depending on applications and thus the present invention should not be limited only to such specific parameters. Therefore, the above description and illustration should not be construed as limiting the scope of the invention, which is defined by the appended claims.

What is claimed is:

1. A linear motion rolling contact guide unit, comprising:

a rail extending over a desired length, said rail being formed with a first inner guiding means of a first kind, a second inner guiding means of the first kind and a third inner guiding means of a second kind different from the first kind, each of said guiding means extending in parallel with a longitudinal axis of said rail;

a slider slidably mounted on said rail, said slider being formed with a first outer guiding means of the first kind located opposite to and spaced apart from said first inner guiding means to thereby define a first guide channel therebetween, a second outer guiding means of the first kind located opposite to and spaced apart from said second inner guiding means to thereby define a second guide channel therebetween and a third outer guiding means of the second kind located opposite to and spaced apart from said third inner guiding means to thereby define a third guide channel therebetween;

a plurality of first rolling members of the first kind provided in each of said first and second guide channels to thereby provide a rolling contact between said rail and said slider through said first rolling members;

a plurality of second rolling members of the second kind provided in said third guide channel to thereby provide a rolling contact between said rail and said slider through said second rolling members; and wherein said first rolling members are rollers and said second rolling members are balls.

2. The guide unit of claim 1, wherein said slider includes first, second and third endless circulating paths, each including a load path section, a return path section and a pair of curved connecting path sections connecting the corresponding ends of said load and return path sections, and wherein the load path section of said first endless circulating path corresponds to said first guide channel with the load path sections of said second and third endless circulating paths corresponding to said second and third guide channels, respectively.

3. The guide unit of claim 1, wherein each of said first and second inner and outer guiding means includes a substantially flat guide surface.

4. The guide unit of claim 3, wherein each of said third inner and outer guiding means includes a pair of curved surfaces arranged in the shape of a Gothic arch.

5. The guide unit of claim 4, wherein each of said balls makes contact with each of said curved surfaces defining the shape of a Gothic arch at two points so that a first contact angle is defined between these two points between each of said balls and one of said pair of curved surfaces and a second contact angle is defined between each of said balls and the other of said pair of curved surfaces.

6. The guide unit of claim 5, wherein said first contact angle is set differently from said second contact angle.

7. The guide unit of claim 6, wherein said first contact angle is set approximately at 90 degrees and said second contact angle is set approximately at 120 degrees.

8. The guide unit of claim 1, wherein said third guiding means is located in level between said first and second guiding means.

9. The guide unit of claim 1, wherein said third guiding means is located at a level other than an intermediate level between said first and second guiding means.

* * * * *